(12) United States Patent
Eberwein et al.

(10) Patent No.: US 7,881,469 B2
(45) Date of Patent: Feb. 1, 2011

(54) CRYPTO-WIRELESS-TAG

(76) Inventors: Jörg Eberwein, Braendlestr. 20, 91207 Lauf-Neunhof (DE); Stefan Werden, Oberwiesenthalerstr. 12, 91207 Lauf (DE); Bernhard Roeger, Allerberger Str. 113, 90461 Nuernberg (DE)

( * ) Notice: Subject to any disclaimer, the term of this patent is extended or adjusted under 35 U.S.C. 154(b) by 1055 days.

(21) Appl. No.: 11/296,285

(22) Filed: Dec. 8, 2005

(65) Prior Publication Data
US 2006/0133606 A1 Jun. 22, 2006

(30) Foreign Application Priority Data
Dec. 9, 2004 (DE) .......................... 10 2004 059 391

(51) Int. Cl.
*H04K 1/02* (2006.01)
(52) U.S. Cl. ........................ 380/255; 713/193
(58) Field of Classification Search ................ 713/191; 726/9; 342/51, 42; 340/571; 380/255
See application file for complete search history.

(56) References Cited

U.S. PATENT DOCUMENTS

| | | | |
|---|---|---|---|
| 4,672,182 A * | 6/1987 | Hirokawa | 235/436 |
| 5,131,038 A | 7/1992 | Puhl et al. | |
| 5,469,170 A * | 11/1995 | Mariani | 342/51 |
| 5,550,547 A * | 8/1996 | Chan et al. | 342/42 |
| 6,501,390 B1 | 12/2002 | Chainer et al. | |
| 7,061,896 B2 * | 6/2006 | Jabbari et al. | 370/338 |
| 7,111,173 B1 * | 9/2006 | Scheidt | 713/186 |
| 7,312,707 B1 * | 12/2007 | Bishop et al. | 340/572.1 |
| 7,350,230 B2 * | 3/2008 | Forrest | 726/9 |
| 2004/0250095 A1 * | 12/2004 | Feldman | 713/191 |
| 2005/0138354 A1 * | 6/2005 | Saltz | 713/153 |
| 2007/0176744 A1 * | 8/2007 | Park et al. | 340/10.1 |

FOREIGN PATENT DOCUMENTS

| | | |
|---|---|---|
| DE | 43 42 641 | 6/1995 |
| DE | 101 13 829 A1 | 9/2002 |
| EP | 0 393 784 A1 | 10/1990 |
| EP | 0 600 646 A2 | 6/1994 |
| EP | 0 758 777 | 2/1997 |
| WO | WO 01/57807 | 8/2001 |
| WO | WO 02/075932 A2 | 9/2002 |
| WO | WO 03/007623 | 1/2003 |
| WO | WO 03/050757 | 6/2003 |
| WO | WO 2004/034321 | 4/2004 |
| WO | WO 2004/070682 A2 | 8/2004 |

OTHER PUBLICATIONS

M Ohkubo; Cryptographic approach to "privacy-friendly" tags; year: 2003; NTT lab; p. 1-9.*

Cliff Reiter ; With J: public key cryptography ; Year of Publication: 2001; ACM, New York, USA; ISSN:0163-6006 ; 1-4.*

(Continued)

*Primary Examiner*—Kambiz Zand
*Assistant Examiner*—Monjour Rahim
(74) *Attorney, Agent, or Firm*—Antonelli, Terry, Stout & Kraus, LLP.

(57) ABSTRACT

The crypto-wireless-tag containing a data set, which is characterized in that it comprises at least one block of crypto data.

21 Claims, 3 Drawing Sheets

OTHER PUBLICATIONS

Figure 1:
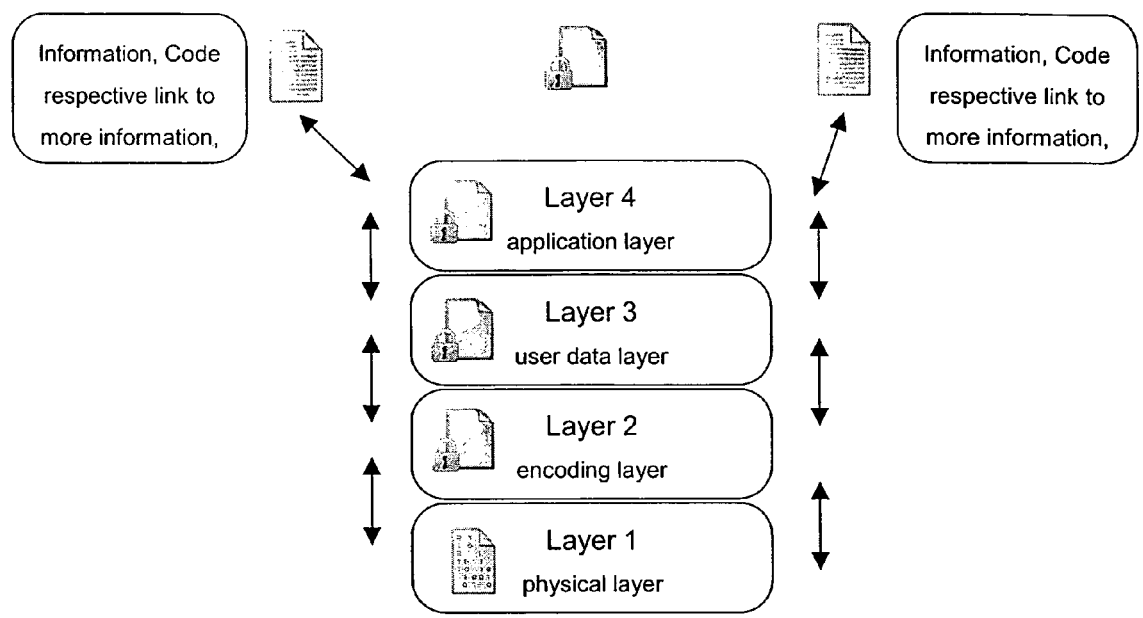

Can We Trust Cryptographic Software? Cryptographic Flaws in GNU Privacy Guard v1.2.3; Phong Q. Nguyen; Apr. 2004; vol. 3027/2004; pp. 1-16.*

International Search Report, for Application No. PCT/DE2005/002207, dated Mar. 3, 2006.

H. Schmundt, "Das Internet der Dinge", *Dar Spiegel*, 46/2004, pp. 190-194.

A. Juels, et al., "Squealing Euros: Privacy Protection in RFID-Enabled Banknotes", Lecture Notes in Computer Science. (XP-002338983), Jan. 1, 2003.

M. Feidhofer, "An Authentication Protocol in a Security Layer for RFID Smart Tags", Electrotechnical Conference, Melecon. Proceedings of the 12th IEEE Mediterranean Dubrovnik, Croatia. May 12-15, 2004. pp. 759-762.

M. Ohkubo, et al., "Cryptographic Approach to "Privacy-Friendly" Tags", NTT Laboratories, (XP-002340389), 2003.

M. Feidhofer, at al., "Strong Authentication for RFID Systems Using the AES Algorithm", CHES, International Association for Cryptologic Research (XP-019009377), 2004. pp. 357-370.

A. Juels, "Minimalist Cryptography for Low-Cost RFID Tags", Lecture Notes in Computer Science (XP-002367040). Sep. 2004.

A. Juels, et al., "Squealing Euros: Privacy Protection in RFID-Enabled Banknotes", RSA Laboratories, Bedford, MA 01730, USA (22 pp.).

General EAN.UCC Specifications, Version 5.0 (Jan. 2004), Table of Contents, and Sections 0, 1, 2.0-2.7, 3, 4, 5.0-5.5, 6-8.

EPC-global, EPC Tad Data Standards Version 1.1, Rev. 1.25 (Aug. 2004), pp. 1-83.

ANSI NCITS 256-2001, Radio Frequency Identification, Jun. 2001, pp. 1-289.

BSR INCITS 371.1-371.3, Real Time Locating Systems, 2003, pp. 1-20 (371.1), 1-20 (371.2) and 1-31 (371.3).

ISO, IEC, Committee JTC-1 of ISO and IEC inclusive Automatic Identification and Data Capture (AIDC), here especially sub committee 31 (SC31) with working group 4 (WG4) for "RFID for Item Management", ISO/IEC FDIS 15963 and 18000-1 through 18000-7 (2003).

ISO, IEC, Committee JTC-1 of ISO and IEC inclusive Automatic Identification and Data Capture (AIDC), here especially subcommittee 31 (SC31) with working groups 1-3 (WG1-3) for "Automatic Identification and Data Capture", ISO/IEC CD 15424 and ISO IEC SC31 FDIS 19762-1, Feb. 2007.

* cited by examiner

CRYPTO-WIRELESS-TAG

The invention relates to a wireless tag ('wireless label'; commonly known as 'RFID-(Radio Frequence Identification) Tag' or 'wireless label') with crypto properties (hereinafter 'crypto-wireless-tag'), i.e. a feature to hold blocks of data, containing encrypted data, corresponding crypto or encryption keys and/or digital signatures; furthermore, the invention relates to a method to operate the crypto-wireless-tag and a wireless-crypto-system for the use of the crypto-wireless-tag.

Wireless tags are marker, as e.g. labels, containing a set of data of different length—often as the power of 2, i.e. 32 bit, 64 bit, 128 bit etc. The data sets are readable and/or writeable in a contactless manner, typically by a radio signal (RFID-Tag) sent by a reading and/or writing device. The way of reading is defined by a reading protocol, which is specified by an instruction set. The reading and writing, respectively can be done by standards, as they will be approved or have been approved by the following organizations

- EPC-global (e.g. EPC Tag Data Standards version 1.1, Rev. 1.25);
- EAN.UCC (e.g. General EAN.UCC Specification version 5.0);
- ISO, IEC, Committee JTC-1 of ISO and IEC inclusive Automatic Indentification and Data Capture (AIDC), here especially sub committee 31 (SC31) with working groups 1-3 (WG1-3) for 'Automatic Indentification and Data Capture' as well as WG4 for 'RFID for Item Management';
- ANSI, e.g. ANSI INCITS T6—RFID and ANSI INCITS T20—Real Time Location Systems (RTLS).

The data sets can contain one or more blocks of data, such as a block of data for a check sum, a block of data for a manufacturer identification etc. Basically, there may also exist one or more disposable blocks of data in the data set, e.g. for manufacturer specific product information.

As a rule, known wireless tags show the problem, that the data set is also readable by unauthorized persons. Therefore, it was proposed—see "Der Spiegel" 46/2004, p. 194, columns 1 and 2—to protect the radio labels by a password, which is expensive, slow and complex.

Another problem is that the read data set can be interpreted and modified with relatively less effort. Thereby, product pirates could—if applicable, using acknowledgement information of data sets of authentic wireless tags—produce own tags, which, in general operation, are not distinguishable from the genuine product. Also, manufacturers or dealers could modify a product information, e.g. a date of expiry etc., without being easily traceable.

Therefore, it is an object of the present invention, to provide a relatively easy and fast opportunity for solving one or more of above mentioned problems. In particular, it is an object of the present invention to aggravate the readability of a wireless tag to unauthorized persons. It is another special object of the present invention, to complicate falsifications of wireless tags. Yet another special object of the present invention is to facilitate authentication and/or identification of the tag or items connected therewith.

This object will be solved by a crypto-wireless-tag according to claim 1, a method to operate at least one wireless-tag according to claim 6 and a wireless-crypto-system according to claim 16. Advantageous embodiments are defined in dependent claims.

The crypto-wireless-tag contains a readable data set, comprising at least one block of crypto data. Thereby, in the first instance the form of the data set is irrelevant and not limited to standardized formats. The data set also can be the block of crypto data itself, thus, having no further blocks of data. The data set may have more blocks of crypto data of different functions and/or keys. A block of crypto data means a data area, to which at least one cryptographic key is associated, to encrypt, decrypt or identify (e.g. for digital signing) data, i.e. comprises such a key and/or comprises an information where such a key is provided.

Firstly, by scanning of the key a crypto-wireless-tag can individually be identified, and therefore authenticated, whereas the key, e.g. a digital signature, can not easily be created or falsified due to its cryptographic nature. Secondly, the key can be used—alternatively or in combination—to encrypt the whole further data set and or a part thereof, so that only the authorized user can read and write the encrypted data, respectively. Because keys do not need to be entered every time like a password, the cryptographic methods can be performed easily and fast, if applicable fully automatic.

Any type of a wireless-tag can be used.

Preferably, the crypto-wireless-tag is compliant to one or more standards, as for example mentioned above. This can be achieved, for example, by allocation of an empty array (or partial array) with the key and the key index, respectively.

Any suitable encryption method can be used to encrypt and decrypt, respectively, data and/or to sign and authenticate and verify, respectively.

A crypto qualifier can be associated to the block of crypto data for its faster identification and designation, respectively. A crypto qualifier means a string, which indicates the presence of a block of crypto data. The crypto qualifier may be a block of data by itself or part of the block of crypto data.

Preferably, the at least one block of crypto data—i.e.: the one block of crypto data or at least one of a multiplicity of blocks of crypto data—comprises a cryptographic key for direct use of the cryptographic method, since thus an external obtaining of the key, which individually belongs to the wireless-tag, can be omitted due to the hint. The key may as well be split over several blocks of crypto data.

Preferably, the at least one other block of data—if required including another block of crypto data—is encrypted based on the at least one block of crypto data to complicate an unauthorized reading and modifying. Thus, also manufacturers' instructions, product IDs, dates of expiry etc. can be protected from unauthorized access.

Preferably, as a secure and commonly used encryption method a 'public-key-method' is used, which applies a distinct crypto key pair, also designated as 'public key' and 'private key' ('secret key'). Preferred known examples of encryption for utilization according to a crypto-wireless-tag are based on the international standard OpenPGP (RFC2440) or PGP. Particularly preferred is the encryption program GNU-Privacy-Guard (GnuPG), developed by the GNU-Privacy-Project (GnuPP) is preferred.

These asymmetric encryption methods can be used, e.g. if the at least one block of crypto data comprises the public-Key. Preferably, the private/secret key is archived at a special key-server, e.g. of the manufacturer or at a trustcenter.

It is understood that other—symmetric and asymmetric—encryption methods with corresponding keys can also be used. The encryption method is not limited, therefore, it can be based on other encryption algorithms and encryption programs, respectively, such as conventional RSA-Encryptions, SSL, SSH, SHA-1, MD-5, different Huffman-methods etc.

Key and key pairs, respectively, may also be designed as 'One time pads' (OTPs), analog to PIN/TAN method for Online-Banking.

A wireless-tag may also simultaneously contain digital signatures and crypto data keys; thus the signature can be encrypted simultaneously.

The object is also solved by a method to operate at least one crypto-wireless-tag, in which at least one block of crypto data is read by at least one reading device and at least one cryptographic method is performed by using at least one key assigned to the at least one block of crypto data. Assigned means herein that the key is either contained in the block of crypto data—and, if applicable, has to be extracted—or may be obtained by a linked access. By means of the cryptographic method, encryption and/or decryption can be performed or a digital signature can be verified, e.g. depending on the type of tag, the decoding or encoding method and the key type.

For this purpose, an adequate infrastructure is required, which can comprise, e.g. secure data links (e.g. SSL encrypted), databases (e.g. at specific crypto servers), devices (e.g. access controlled or secured with Dongles), programs (e.g. access controlled).

Particularly preferred, especially for the use of asymmetric encryption methods, the performance of a cryptographic method occurs by means of an asymmetric encryption method, such as a RSA-based method, such as PGP or GnuPG etc., in which at least one of the blocks of crypto data of the tag comprises a public key and the at least one external block of crypto data comprises a secret key.

To ensure secure performance of the method, it is advantageous, if the other external block of crypto data is derived from a crypto database, particularly, if the crypto database is part of a trustcenter or of a specifically secured area.

For protection from unauthorized reading of the data set of a tag it is also advantageous, if at least one other block of data—possibly another block of crypto data—of the crypto-wireless-tag, which has been encrypted based on the at least one block of crypto data, is set out decrypted and readable, not until the cryptographic method is performed.

In this context, it is initially irrelevant at which instance (e.g. a program or the end user) the data are set out readable and at which layer/layers (see description of FIG. 1) performing of the cryptographic method occurs, respectively.

Preferably, the at least one signature contained on at least one block of crypto data of the crypto-wireless-tag is verified by the use of the cryptographic method for fast and easy authentication.

For operation of the method it is also advantageous, if the use of the cryptographic method in the reading device occurs within a downstream external crypto client or crypto module (corresponding to a crypto program component, hereinafter designed as crypto module)—here: a hardware or software implemented own device to perform the crypto method— and/or within a middleware, e.g. at the so called 'Point-of-Sales'/POS. The crypto client or the crypto module may also be integrated into the writing/reading device or into other programs, particularly middleware, in which case a call of the crypto client or crypto module preferably occurs via an own Application Programming Interface (API).

In case that the reading device in reading of the wireless tag initially does not recognize the presence of the at least one block of crypto data, it is advantageous, in particular, for easy and fast reading of tags, particularly, by using encrypted and normal wireless tags, if the reading device is configured depending on displayed error message to recognize the at least on block of crypto data and the reading process is repeated at least once.

'Reading' relating to the above described method also means writing of data, whereas the reading device (or reading/writing device) is then configured to write data; and the above mentioned method is reversed accordingly in a suitable manner; for example instead of a decryption, an encryption is required, namely before operation of the writing device (or reading/writing device).

The method also comprises combined reading and writing steps.

The object is also solved by a wireless-crypto-system, which comprises at least one reading device for reading (or writing device for writing) of the at least one block of crypto data of a crypto-wireless-tag, furthermore, a data link to a crypto database, as well as a device for performing the cryptographic method by the use of at least one block of crypto data of the crypto-wireless-tag, as well as an external block of crypto data available from the crypto database, wherein the device for performing the cryptographic method is configured for receipt of the block of crypto data of the crypto-wireless-tag and for receipt of the external block of crypto data. Depending on the operation mode (reading/writing) unencrypted data can be read out to a middleware, or encrypted data can be sent to the writing device.

A particularly preferred wireless-crypto-system has a device for performing the cryptographic method, which is a—hardware or software implemented—crypto client or a crypto module, which is, e.g., implemented within the writing/reading device and/or in an independent form (e.g. a dongle or a crypto-box) downstream to the reading device and/or integrated into a middleware. In case of integration into other programs, the crypto module can be, e.g., called via APIs or as sub-program.

It is understood that a wireless-crypto-system is also encompassed, which is—instead of or additionally—not only equipped for reading and decryption of data stored on the crypto-wireless-tag, but also for encryption and writing of data to the crypto-wireless-tag.

In the following examples the invention will be schematically illustrated in more detail.

Figure 2:
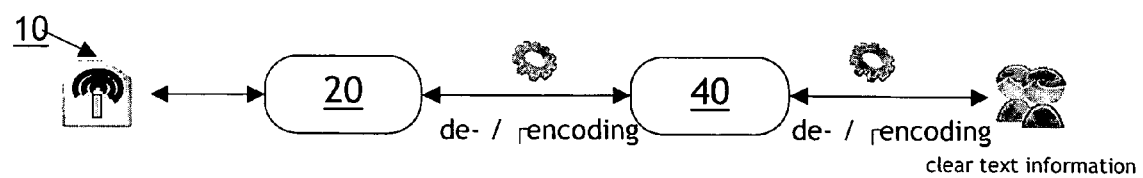

FIG. 1 schematically shows a layer model of the data process of a wireless tag;

FIG. 2 schematically shows a reading/writing method of a conventional prior art wireless tag;

FIG. 3 shows in its subfigures 3(a) to 3(d) respective variants for the operation of the crypto-wireless-tag.

In FIG. 1 a layer model of wireless tags is shown.

Layer 1 represents the physical layer and is defined by the specification for different wireless tags. This layer describes how data is written and read from a wireless tag.

Layer 2 represents the encoding layer. This layer describes the structure of a data stream, which is written to a wireless tag or read from a wireless tag, i.e. among other things which arrays of information it contains and in which way these arrays (the data of these arrays) are interpreted by corresponding writing or reading devices, and/or the middleware software. Layer 2 can contain the encoding schemes of conventional standards, such as EAN and others. This layer is predominantly used for backward compatibility of presently existing encoding schemes. Generally, it is possible to define new encoding schemes, preferably not conflicting with existing encoding schemes, so that consistency of already existing encoding standards is preserved. The terms 'encoding' and 'decoding', respectively, do not refer to cryptographic methods and should not mistaken with terms 'encryption' and 'decryption'.

Layer 3 is designated as User-Data-Layer and contains freely definable data. Layer 3 can contain character data as well as numeric data. In general, Layer 3 can contain any kind of data, which a user intends to write on a wireless tag. Of course, the existing memory limitation has to be taken into account. It is not mandatory that the data contained in Layer 3 are stored in a structure defined by a standard, and therefore, it is required to control these data by superior software and/or hardware instances. Within this layer no interpretation of data occurs.

Layer 4 represents the data instance and is designated as application layer. This is a suitable infrastructure (software and/or hardware) having the information how to interpret data of layer 2 and/or layer 3. Layer 4 receives and produces data and processes these data into corresponding usable data, e.g. usable by the user. This may be a software application, e.g. a (sub-)program, a device driver or any resource operating with layer 3.

The process through the layers is achieved by passing through from higher layers down to lower layers or vice versa. The layers are independent from each other, and therefore, each layer provides an interface for data exchange. This is necessary to define, for example, the architecture of devices, such as reading devices, or of software applications. In case a reading device to read wireless tags exists, which is conceived to read layer 2, the software for the reading device has to be a layer 2 compliant software to obtain full functionality through the layers.

Relating to this layer model, crypto technology can be applied to layer 2, layer 3 and layer 4 (see 'lock'-symbol).

For easier demonstration, this figure does not distinguish between encryption, decryption of information and digital signing of information and the wireless tag per se, respectively.

It is possible to differentiate on which layer the decryption or encryption occurs, respectively, and which information stored on a wireless tag is encrypted. That means, that all or parts of stored data (here: encryption, decryption or a digital signature) are encrypted (cryptographically secured).

In principle, all known crypto/encryption methods can be used to encrypt and decrypt data from a crypto-wireless-tag. For implementation and, e.g. creation of an infrastructure, it is advantageous to use conventional crypto as used, e.g. to encrypt and decrypt emails, respectively. For this purpose, crypto technologies known in the art can be used, such as PGP (Pretty Good Privacy) or GnuPG crypto programs and crypto algorithms, respectively. In this, a limited or unlimited bit stream passes through a crypto process and is transformed into an encrypted bit stream. Since at present wireless tags have a limitation in memory capacity, the encrypted bit stream may be adapted according to the size of the physically available memory. As a consequence, the amount of recordable data is limited by the physical layer 1.

Crypto technology according to the state of the art in combination with a corresponding infrastructure allows to used crypto key pairs as digital signature and identification key, respectively, on wireless tags, against which an authentication can be applied. This digital signature and identification key may be used, respectively, to identify and/or authenticate wireless tags, and thus, also items linked to this tag. Furthermore, the digital signature and identification key, respectively, may be used as index to a source of data, which may provide more information. Digital signing has the advantage that it is possible to operate with stable bit stream length. Each crypto key used for this method, has a defined length depending on the used crypto mode (e.g., 64 bit or 2024 bit crypto key). In case that bit stream length of the used key exceeds the bit stream length defined by layer 1, compression algorithms may be used to adapt bit stream length of the crypto key. A crypto-wireless-tag can also hold several blocks of data with several functions, such as encryption and signature.

The underlying infrastructure can be completely or partially opened to the public or can be completely or partially limited to instances.

The data set, stored on the wireless tag possesses the general structure, if applicable depending on respective layer, (B1|B2|...|KB1|Bi|Bi+1|KB2|...)

with B1, B2, ..., Bi, Bi+1, ... general blocks of data and KB1, KB2 blocks of crypto data. The number, length and sequence of blocks of data can be adapted to individual requirements. For example, KB1 can be a public key, KB2 a digital signature, etc. The general blocks of data B1, B2, ..., Bi, Bi+1, ... can be partially or completely encrypted by themselves or can be non-encrypted as a whole. Blocks of data may be defined at each layer.

FIG. 2 schematically shows a reading/writing method of a conventional unencrypted prior art wireless tag.

A wireless tag 10 with an encoding scheme, but without encryption is used. The data of the wireless tag 10 are read by a reading device 20 and processed by a middleware 40. The middleware 40—e.g. an administration software based on SAP or the like—processes data to information, which have a significance to the end user (here indicated as figures). These end user could be, e.g., a salesperson, a transport person, a trader, a customs officer or an end user. In this figure the encoding, thus, the conversion of information at a higher layer, occurs downstream to the reading device 20, if applicable also by an unit, e.g. software integrated into a reading device, and then, in a further step, forward to the end user (the encoding and decoding, respectively, symbolically indicated by small wheels).

Writing of information to the wireless tag 10 occurs in reversion of this method. In this context, no reading device has to be used, but a corresponding writing device, preferably a combined reading/writing device 20; instead of encoding, decoding is used.

In the process described herein, no encryption and decryption exists, respectively.

Figure 3A:
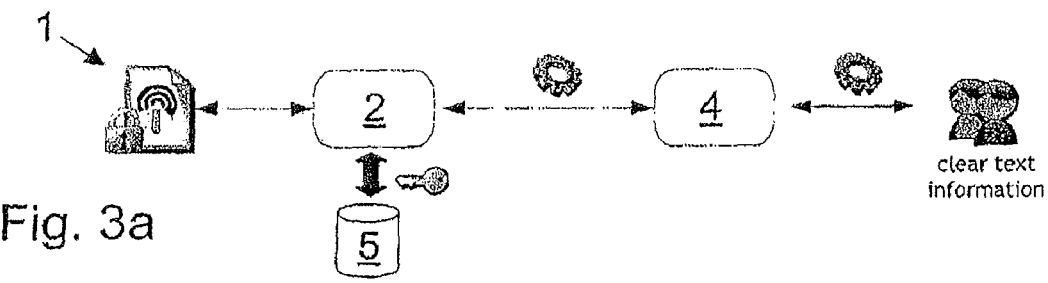

FIG. 3a schematically shows a method for reading and/or writing of a crypto-wireless-tag 1.

The reading or writing device 20 has the function to decrypt and encrypt wireless tags 1, respectively. For this purpose, the reading or writing device 2 is connected to an appropriate infrastructure providing corresponding information, which is required to encrypt and decrypt the wireless tag 1, respectively. In this figure, the infrastructure comprises a crypto database 5 with information, which is required to encrypt and decrypt, respectively, such as a secret key. The database can be part of the infrastructure, e.g. of a company internal network, or functionally connected to it, e.g. as independent trustcenter, which is connected via a data link to the company network.

Thus, in this figure, encrypted data are read from the reading device 2, decrypted by means of the public key contained on the tag and the secret key of the crypto database 5, and then processed as usual, i.e. decoded or encoded.

Figure 3B:
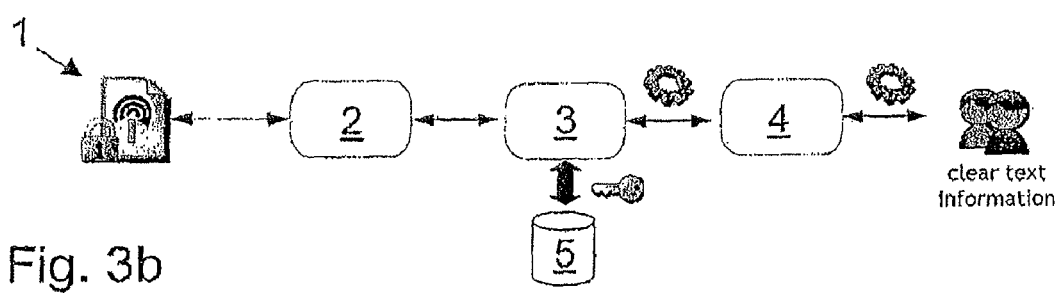

FIG. 3b schematically shows another method similar to the method shown in FIG. 3a for reading and/or writing of the crypto-wireless-tag.

In this case, a corresponding instance designated as crypto client or Crypto module 3 is inserted between the reading or writing device 2 and the middleware 4. In this embodiment, the data are not sent from the reading or writing device 2 to the middleware 4, or vice versa, but pass through the crypto client or crypto module 3, which performs the encryption and decryption, respectively. The crypto client or crypto module 3 is connected to an appropriate infrastructure, here to a database 5, providing corresponding information, which is required to respectively encrypt and decrypt the data, e.g. the public key.

Figure 3C:
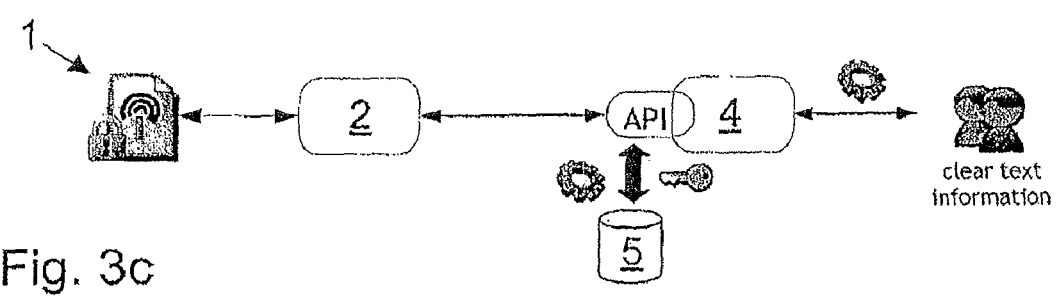

FIG. 3*c* schematically shows another method similar to the method shown in FIGS. 3*a* and 3*b* for reading and/or writing of the crypto-wireless-tag.

This embodiment is very similar to the embodiment shown in FIG. 3*b*, unless the crypto client or crypto module 3 is part of the middleware 4. The middleware itself, e.g. a SAP-program or another administration software, has an Application Programming Interface (API), which may be used by an appropriate infrastructure in this case providing the relevant information from a crypto database 5, which is required to encryption and decryption of the data, respectively.

Figure 3D:
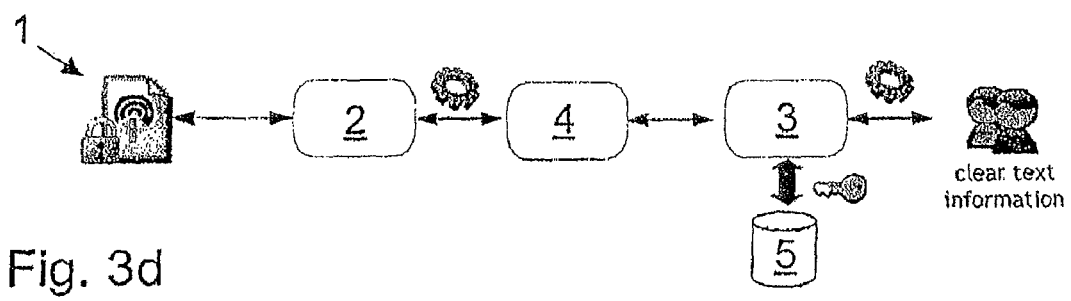

FIG. 3*d* schematically shows another method similar to the method shown in FIGS. 3*a* to 3*c* for reading and/or writing of the crypto-wireless-tag 1.

In this embodiment the crypto client/crypto module 3 is placed between the middleware 4 and end user for encryption and decryption, respectively.

The above mentioned as well as other suitable methods for operating the a crypto-wireless-tag 1 may be used in manifold applications, which are not limited by this description. In the following some application scenarios and—examples are specified.

1. The Use of an Encryption

Protection of the Privacy

By using the present wireless tag technology, the protection of the privacy is not guaranteed, i.e. unauthorized third parties may access information, which is sent by the unencrypted wireless tag. By using crypto-wireless-tags an unauthorized reading of information is completely or partially excluded. From a variety of possible applications for crypto-wireless-tags, the following examples are given:

(i) Retail Industry

In the future, retail products may be labeled with crypto-wireless-tags. This facilities accounting at the cash desk, because the purchase can be detected by reading devices and the bill is prepared. The access to the product information should be limited to the salesperson and the customer. By the use of non-encrypted data, an unauthorized third party may obtain—e.g. by installing an (own) secret reading device—information of prices and number of the purchased products. This, in turn, enables conclusions to product sales volume, pricing and buying behavior. This can be avoided by using crypto-wireless-tags.

(ii) Biometric Data—Diagnostica

Samples of human origin sent by physicians to laboratories are presently clear text labeled with information of the patient and the order for examination. To protect this information against access of unauthorized third parties and to exclude mistakes of samples the samples can be labeled with crypto-wireless-tags.

(iii) Transport of Luggage at Air Travel

On national and international air travels, pieces of luggage are tagged with bar code labels, on which the departure and arrival location, the flight number as well as the passengers name is transparent to everybody. Due to specific destinations, one can expect a more valuable luggage content leading to increased thievery. In this case, it is possible to use Crypto-Wireless-Tags instead of the bar code labels to protect personal flight information.

2. The use of Digital Signature

Proof of Origin—Genuine Certificate

Presently, a significant economic damage is caused over all branches by illegal produced, falsified or copied products. Crypto-wireless-tags with a digital signature, allow to keep a genuine certificate at product level. This is achieved by combining digitally signed crypto-wireless-tags with an appropriate environment, e.g. a hierarchical trustcenter, as authentication instance. Of a variety of possible applications for crypto-wireless-tags, the following examples are given:

(i) Plagiarism, Forgery

Branded goods, original spare parts, pharmaceuticals, money and identity-cards, etc. will be tagged with digitally signed crypto-wireless-tags. Thereby, the manufacturer and singleness of the product is explicitly detectable. An appropriate environment provided, another product with the same label is explicitly detectable as falsification.

(ii) Protection of Copyrights

At present, there are nearly no options to avoid illegal duplication of copyrighted contents on digital media. By combining a digital media containing contents, which are to be copyrighted, with crypto-wireless-tags and an appropriate infrastructure, illegal duplicates will be non-functional.

The invention claimed is:

1. A crypto-wireless-tag which comprises a plurality of memory blocks,
wherein at least one block of the plurality of memory blocks comprises a block of crypto data;
wherein the at least one block of crypto data of the plurality of memory blocks comprises a cryptographic key;
wherein at least one other block of data is encrypted on the basis of the at least one block of crypto data of the plurality of memory blocks;
wherein the at least one block of crypto data comprises at least one public key, of an asymmetric encryption method;
wherein the cryptographic key is configured to authenticate or identify the crypto-wireless-tag;
wherein the at least one other block of data comprises general data; and
wherein the at least one block of crypto data or the at least one other block of data comprises encoded data.

2. The crypto-wireless-tag according to claim 1, wherein the at least one block of crypto data comprises one digital signature.

3. The crypto-wireless-tag according to claim 1, wherein the cryptographic key stored in the crypto-wireless-tag is used to directly decrypt the encrypted code received from the crypto-wireless-tag.

4. A method to operate at least one crypto-wireless-tag, said at least one crypto-wireless-tag comprising:
a plurality of memory blocks,
wherein at least one block of the plurality of memory blocks comprises a block of crypto data;
wherein the at least one block of crypto data of the plurality of memory blocks comprises a cryptographic key;
wherein at least one other block of data is encrypted on the basis of the at least one block of crypto data of the plurality of memory blocks;
wherein the at least one block of crypto data comprises at least one public key, of an asymmetric encryption method;
wherein the cryptographic key is configured to authenticate or identify the crypto-wireless-tag, wherein the at least one other block of data comprises general data; and wherein the at least one block of crypto data or the at least one other block of data comprises encoded data;

said method comprising at least the following steps:

at least one of reading and writing at least one block of crypto data of the crypto-wireless-tag performed by at least one reading device and by at least one writing device; and performing a cryptographic method by using at least one key, associated to the at least one block of crypto data.

5. The method according to claim 4, wherein the performing the cryptographic method occurs by means of at least another external block of crypto data.

6. The method according to claim 4, wherein reading at least one block of crypto data of the crypto-wireless-tag performed by at least one reading device.

7. The method according to claim 4, wherein writing at least one block of crypto data of the crypto-wireless-tag performed by at least one writing device.

8. The method according to claim 4, wherein at least one of reading and writing at least one block of crypto data of the crypto-wireless-tag performed by at least one reading device and by at least one writing device.

9. The method according to claim 5, wherein the another external block of crypto data is derived from a crypto database.

10. The method according to claim 5, in which performing of the cryptographic method is carried out by means of an asymmetric encryption method, wherein at least one of the blocks of crypto data comprises a public key, and the at least one external block of crypto data comprises a secret key.

11. The method according to claim 5, wherein by performing the cryptographic method at least a further block of data of the crypto-wireless-tag which is encrypted on the basis of at the least one block of crypto data, is unencrypted and thereby made readable.

12. The method according to claim 5, wherein by performing the cryptographic method at least one digital signature of the crypto-wireless-tag which is contained within at least one block of crypto data, is verified.

13. The method according to claim 5, wherein the performing of the cryptographic method occurs within the reading device, within a crypto client or a crypto module, downstream to said reading device, and/or within a middleware.

14. The method according to claim 5, wherein, in the case that the reading device does not initially recognize the presence of the at least one block of crypto data by reading the crypto-wireless-tag, the reading device is configured dependent on an error message given by the reading device, and the read operation is repeated at least once to recognize the at least one block of crypto data.

15. The method according to claim 9, wherein the crypto database is part of a trustcenter.

16. The method according to claim 9, wherein said asymmetric encryption method is a RSA method.

17. The method according to claim 10, wherein said asymmetric encryption method is an encryption program GNU-Privacy-Guard.

18. A wireless-crypto-system comprising:

a crypto-wireless-tag which comprises a plurality of memory blocks, wherein at least one block of the plurality of memory blocks comprises a block of crypto data;

wherein the at least one block of crypto data of the plurality of memory blocks comprises a cryptographic key;

wherein at least one other block of data is encrypted on the basis of the at least one block of crypto data of the plurality of memory blocks;

wherein the at least one block of crypto data comprises at least one public key, of an asymmetric encryption method; and wherein the cryptographic key is configured to authenticate or identify the crypto-wireless-tag;

a reading device for reading the at least one block of crypto data of the crypto-wireless-tag;

wherein the at least one other block of data comprises general data; and wherein the at least one block of crypto data or the at least one other block of data comprises encoded data;

a crypto database with an external block of crypto data; and a device for performing a cryptographic method on the basis of the at least one block of crypto data of the crypto-wireless-tag and the external block of crypto data, wherein the device is configured for performing of the cryptographic method for receiving of the block of crypto data of the crypto-wireless-tag and for receiving of the external block of crypto data.

19. The wireless-crypto-system according to claim 18, wherein the device for performing of the cryptographic method exists as a hardware and/or software implemented crypto client or crypto module, which is integrated into a reading device, and/or is independent, and/or is integrated into a middleware.

20. The wireless-crypto-system according to claim 18, which is adapted to write cryptographic data onto the crypto-wireless-tag.

21. The wireless-crypto-system according to claim 19, wherein the hardware and/or software implemented crypto client or crypto module is integrated into a middleware via an Application Programming Interface.

* * * * *